(12) United States Patent
Priat et al.

(10) Patent No.: US 10,746,103 B2
(45) Date of Patent: Aug. 18, 2020

(54) PARTIALLY REDUNDANT ELECTRONIC CONTROL SYSTEM

(71) Applicant: Safran Power Units, Toulouse (FR)

(72) Inventors: Jerome Priat, Moissy-Cramayel (FR); Vincent Guillaumin, Moissy-Cramayel (FR)

(73) Assignee: Safran Power Units, Toulouse (FR)

( * ) Notice: Subject to any disclaimer, the term of this patent is extended or adjusted under 35 U.S.C. 154(b) by 233 days.

(21) Appl. No.: 16/073,400

(22) PCT Filed: Jan. 27, 2017

(86) PCT No.: PCT/FR2017/050191
§ 371 (c)(1),
(2) Date: Jul. 27, 2018

(87) PCT Pub. No.: WO2017/129917
PCT Pub. Date: Aug. 3, 2017

(65) Prior Publication Data
US 2019/0032573 A1 Jan. 31, 2019

(30) Foreign Application Priority Data
Jan. 29, 2016 (FR) ...................... 16 50756

(51) Int. Cl.
*F02C 9/00* (2006.01)
*F01D 21/00* (2006.01)
(Continued)

(52) U.S. Cl.
CPC ............. *F02C 9/00* (2013.01); *F01D 21/003* (2013.01); *F01D 21/12* (2013.01); *F01D 21/14* (2013.01);
(Continued)

(58) Field of Classification Search
CPC ....................................... F02C 9/00
See application file for complete search history.

(56) References Cited

U.S. PATENT DOCUMENTS

| 4,248,040 A * | 2/1981 | Kast ......................... F02C 9/46 |
| | | 60/39.27 |
| 2003/0056491 A1 * | 3/2003 | Coleman ............. H05K 5/0213 |
| | | 60/39.281 |

(Continued)

FOREIGN PATENT DOCUMENTS

EP 2592253 A1 5/2013

OTHER PUBLICATIONS

International Search Report dated May 17, 2017, in PCT/FR2017/050191, filed Jan. 29, 2016.
(Continued)

*Primary Examiner* — Alex C Dunn
(74) *Attorney, Agent, or Firm* — Oblon, McClelland, Maier & Neustadt, L.L.P.

(57) ABSTRACT

An asymmetrical electronic control system for a gas turbine, which is designed to control a set of functions associated with logic input data or data from sensors and associated with output data, in particular for an actuator, the system including a primary electronic control unit configured to process the entire set of functions; a secondary electronic control unit, partially redundant with the primary unit, configured to process only a strict subset of sufficient functions to operate or start the gas turbine in an acceptable degraded mode when the primary unit is faulty; a redundant or main chain selection and switching module for selecting one or other of the primary and secondary units in order to control the gas turbine according to the operating state of the primary unit.

10 Claims, 3 Drawing Sheets

Figure 1:
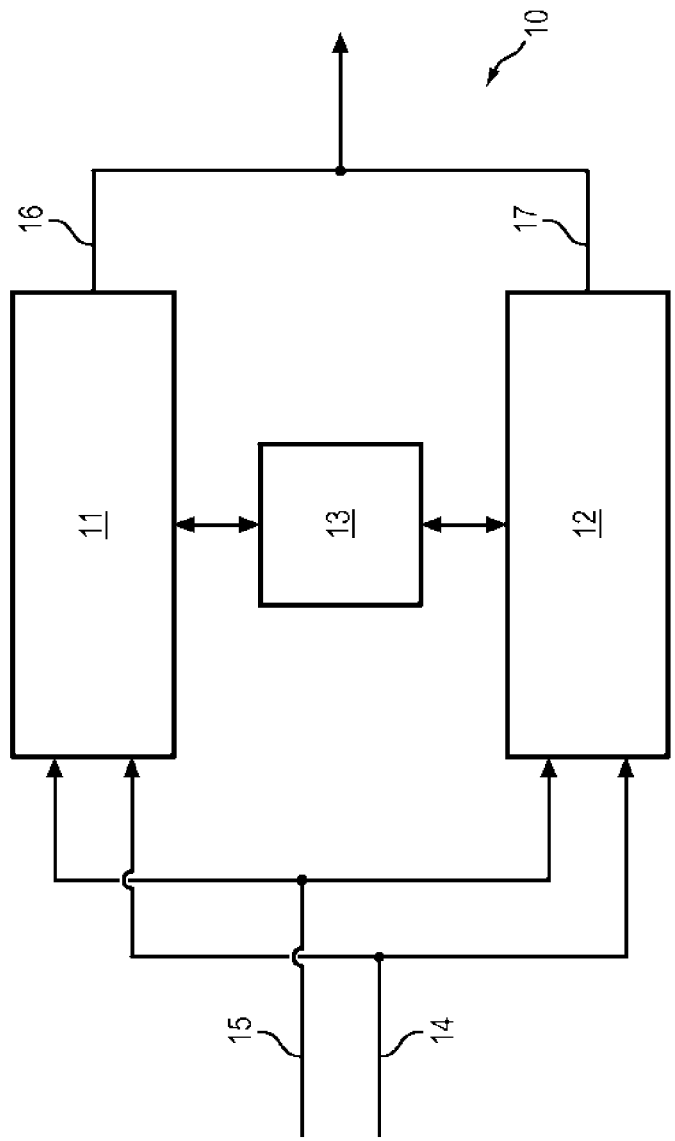

(51) Int. Cl.
*F01D 21/12* (2006.01)
*F01D 21/14* (2006.01)
*F02C 7/06* (2006.01)
*F02C 7/264* (2006.01)
*F02C 9/28* (2006.01)

(52) U.S. Cl.
CPC ............... *F02C 7/06* (2013.01); *F02C 7/264* (2013.01); *F02C 9/28* (2013.01); *F05D 2220/323* (2013.01); *F05D 2220/329* (2013.01); *F05D 2220/50* (2013.01); *F05D 2270/46* (2013.01); *F05D 2270/54* (2013.01)

(56) References Cited

U.S. PATENT DOCUMENTS

| | | | | |
|---|---|---|---|---|
| 2004/0176879 A1* | 9/2004 | Menon | ................ | G06F 11/2257 701/1 |
| 2008/0147290 A1* | 6/2008 | Volponi | ............. | G05B 23/0278 701/100 |
| 2010/0281843 A1* | 11/2010 | Smith | .................... | F04D 17/12 60/39.091 |
| 2011/0213507 A1* | 9/2011 | Dooley | .................... | F02C 9/00 700/287 |
| 2011/0276199 A1 | 11/2011 | Brot | | |
| 2012/0101663 A1* | 4/2012 | Fervel | ...................... | G05B 9/03 701/3 |
| 2013/0013222 A1* | 1/2013 | Gu | ............................ | F02C 9/00 702/33 |
| 2013/0138322 A1 | 5/2013 | Genevrier et al. | | |
| 2015/0168230 A1* | 6/2015 | DeSilva | ................. | F23N 5/003 374/117 |
| 2015/0185716 A1* | 7/2015 | Wichmann | ................ | G05F 1/66 700/287 |
| 2017/0274992 A1* | 9/2017 | Chretien | ................. | B64C 27/14 |

OTHER PUBLICATIONS

French Preliminary Search Report and Written Opinion dated Dec. 6, 2016 in Patent Application No. 1650756 (with English language translation of categories of cited documents).

* cited by examiner

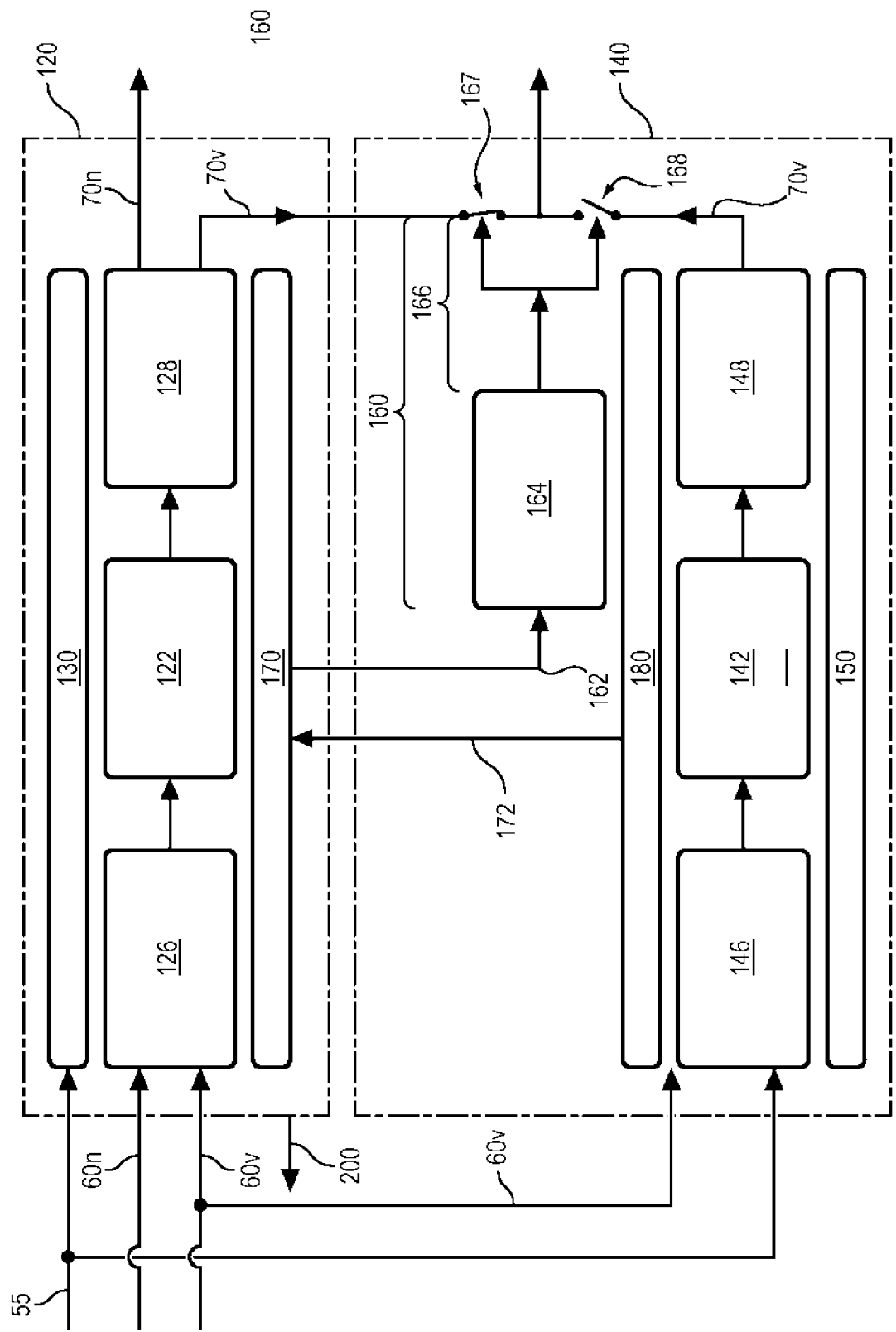

PARTIALLY REDUNDANT ELECTRONIC CONTROL SYSTEM

GENERAL TECHNICAL FIELD

The invention relates to the field of managing gas turbines, especially for propulsion, such as a helicopter, aircraft, missile or drone engine, or also for power generation, such as an auxiliary power unit (APU)

More precisely, the invention relates to full-authority electronic regulation systems for gas turbine.

These systems are known by the name FADEC, for "Full Authority Digital Engine Control" and serve to control and regulate the gas turbine as a function for example of data coming from sensors or instructions.

More generally, these regulating systems belong to the field of electronic control units of gas turbines, generally called EECU for "Electronic Engine Control Unit".

PRIOR ART

The FADEC must obey demanding operational reliability restrictions. This is for example MTBF, for "Mean Time Before Failure" to ensure that there is no operating incident, or also rate of reliability of an APU used for ETOPS applications (for "Extended-range Twin-engine Operation Performance Standards", that is, for flights operating at over an hour from an emergency airport) or for emergency operations which must be over $10^{-6}$/hour (default rate per operation hour) as relates to "stopping in flight" or "non-starting" in flight defaults.

There is a particular FADEC architecture called "double-channel", which achieves the required reliability. Documents EP2592253, GB2355081 and US2005217274 describe this architecture with a few variants.

In reference to FIG. 1, a double-channel control system 10 comprises two redundant electronic control units 11, 12, with their respective inputs and outputs, as well as a selection and switching module device 13 between the two units 11, 12. These two units are identical in terms of manufacture, structure, architecture, component and functionalities. In case of breakdown of one of them, the selection and switching module device 13 performs toggling to the other, ensuring continuity of data processing.

For this purpose, the inputs coming from the sensors 14 are also duplicated, as is the power supply 15. Each of the units 11, 12 includes its own control output 16, 17. Each unit 11, 12 includes especially an electric conversion interface.

There is therefore total physical redundancy of the units and of the data-processing chain. This means that the information can be processed in exactly the same way by the first and the second units 11, 12.

In practice, each unit 11, 12 can be composed of a control card and a surveillance card, the surveillance card of one monitoring the control card of the other. When an anomaly is detected by a surveillance card, the latter controls the selection and switching module device 13 to cause toggling.

To control the operation (detection of dormant breakdown) and spread the use of both units 11, 12, it is provided to change unit each time the turbine is started.

These double-channel FADEC have greater operational reliability than the single-channel FADEC which have an unacceptable reliability rate of $10^{-5}$/hour for the specific applications mentioned previously.

However, the double-channel FADEC are complex to develop and costly compared to a single-channel FADEC. Also, there remains the risk of common breakdown on a double-channel FADEC, linked to the fact that both channels are identical in architecture and manufacture.

PRESENTATION OF THE INVENTION

The present invention aims to simplify the development and manufacture of existing FADEC by proposing an asymmetric electronic control system of a gas turbine configured to control a set of functions associated with logic input data or coming from sensors and associated with output data especially for actuator(s), said system comprising:
- a primary electronic control unit, configured to process the entire set of functions,
- a secondary electronic control unit, partially redundant with the primary unit, configured to process only a strict subset of functions sufficient to maintain in operation or start the gas turbine according to a degraded mode acceptable when the primary unit is in default,
- a selection and switching module for the selection and switching of one or the other of the primary and secondary units for regulating the gas turbine as a function of an operating state of said primary unit.

The invention therefore proposes a control system having two asymmetric channels, adapted to process only some of the functions when the primary unit malfunctions. This particular architecture lowers the operational complexity compared to a double-channel FADEC while maintaining an equivalent rate of reliability for functions made redundant. Also, structural asymmetry, which has repercussions on electronics, functionalities and components, dispenses with common-mode faults linked to the similarity between both units of a double-channel FADEC.

The invention can comprise the following characteristics, taken singly or in combination:
- the strict subset of sufficient functions corresponds to the vital functions of the gas turbine,
- the primary unit and the secondary unit are dissimilar in terms of architecture, but also components and processing data,
- the primary unit is implemented by a digital circuit and the secondary unit is implemented by an analog circuit,
- the primary unit comprises a microcontroller controlled by a software solution and the secondary unit comprises a logic circuit programmable without software,
- the secondary unit is configured to control the operating state of the primary unit and wherein the selection and switching module device is included in the secondary unit,
- the secondary unit comprises fewer components than the primary unit to achieve improved reliability,
- the secondary unit does not process the following inputs (inexhaustive list):
  - Air turbine input temperature sensor,
  - Gas output temperature sensor,
  - Oil filings sensor,
  - Oil filter clogging sensor,
  - Oil level sensor,
  - Oil pressure sensor,
  - Oil temperature sensor,
  - Fuel filter clogging sensor,
  - Fuel temperature sensor,
  - Ambient pressure sensor,
  - Ambient temperature sensor,
  - Logic information:
    - Ground-Flight
    - Equipment 'WARNING' information (ignition unit, fuel pump, alternator controller, etc.), the secondary unit processes only the following inputs (inexhaustive list):
Speed sensor,
Logic information: start/stop of the turbine, and controls the following outputs:
Start engine,
Igniters,
Oil purge valve,
Pilot lights "Gas turbine On" and "Gas turbine Off", and regulates the fuel meter.
each unit comprises an administration interface for supplies configured to provide voltage and intensity adapted to the operation of their respective unit
the two units have separate cycle/calculation times, to have separate electromagnetic points of susceptibility.

The invention also relates to an assembly comprising a gas turbine and an asymmetric control system such as described previously.

Finally, the invention also relates to an aircraft, a helicopter, a drone, a missile or a vehicle comprising an assembly such as presented previously.

PRESENTATION OF FIGURES

Figure 2:
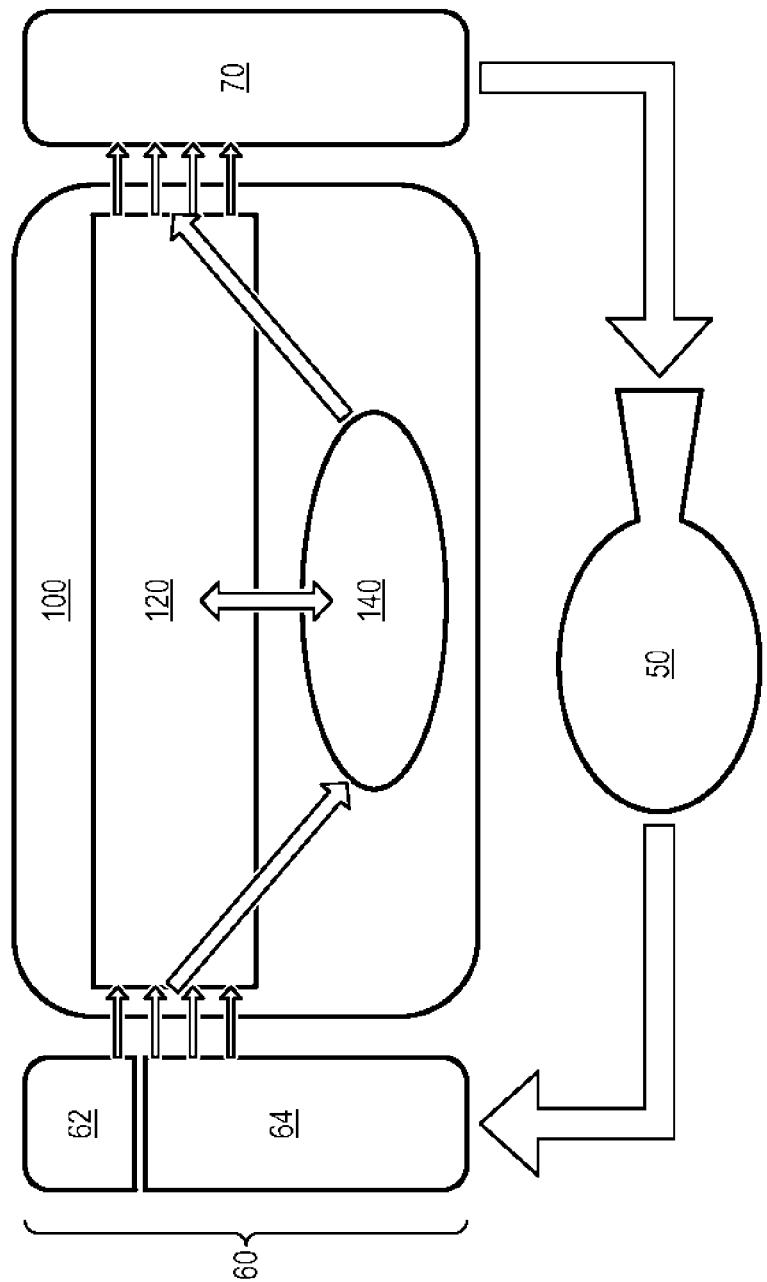

Other characteristics, aims and advantages of the invention will emerge from the following description which is purely illustrative and non-limiting and which must be considered with respect to the appended drawings, in which:

FIG. 1 already presented schematically illustrates a double-channel FADEC comprising two identical units in parallel allowing total redundancy of the data-processing, FIG. 2 schematically illustrates a control system according to the invention, with a secondary unit forming partial redundancy of a primary unit, FIG. 3 illustrates a more detailed embodiment of the control system of FIG. 2.

DETAILED DESCRIPTION

FIG. 2 is a diagram of an asymmetric electronic control system 100 of a gas turbine 50. The detailed description will be illustrated by an aircraft propelled by the gas turbine 50.

The detailed description applies similarly to the APU (Auxiliary Power Unit), or also to any gas turbine 50 controlled by a full-authority system (helicopter, drone, missile, etc.)

The asymmetric electronic control system 100 receives at input different types of data 60 and by means of these data controls or adjusts outputs 70 of different kinds. More generally these are "functions" for designating both the input data and the output data linked to a particular function of the gas turbine or the aircraft. A set of functions is defined, relative to the gas turbine and for which the control unit 100 has full authority as a faultless operation.

The input data 60 can be either logic information 62 on ignition, starting, stopping, shutdown, etc. or measurements coming from sensors 64. FIG. 2 illustrates data from sensors 64 present on the gas turbine 50, but these can be sensors finding data relative to other elements of the aircraft.

The output data 70 can be either instructions on commands for actuators, especially for the gas turbine (fuel valve, lubrication valve, etc.), or indicative information (pilot lights, etc.). The detail of input and output data which can be considered within the scope of the description will be given later.

The control system 100 comprises a primary electronic control unit 120, defining a primary data-processing channel, and a secondary electronic control unit 140, defining a secondary data-processing channel.

The primary unit 120 is configured to process the entire set of functions which a classic control system must process, meaning that all the input data 60 can transit via the primary channel and that the primary unit 120 can control all the outputs 70. The secondary unit 140, as such, is configured to process only a strict subset of the set of functions defined previously, that is, a subset of the functions relative to the inputs 60 and outputs 70. In other terms, the secondary unit 140 receives only one strict subset of input data 60 and therefore controls only one strict subset of output data 70. To this end, the secondary unit 140 is designed to be dissimilar, that is, non-similar, compared to the primary unit 120.

The control system 100 therefore presents two electronic control units 120, 140 asymmetrical in terms of processing of functions, and as a consequence of input 60 and output 70 data. More details will be given later.

These abovementioned strict subsets of input and output data comprise functions sufficient to maintain the gas turbine 50 in operation or start, according to an acceptable degraded mode. In other terms, these subsets do not comprise the functions non-necessary to operation of the aircraft, or the gas turbine, according to degraded mode.

A degraded mode is a mode wherein starting or regulating the gas turbine ensures minimum performance, required for vital operation of the aircraft.

For example, in a degraded mode, the gas turbine starts up without considering altitude or air temperature.

A selection and switching module 160 is provided for selecting the secondary channel 140 as a function of the operating state of the primary unit 120. In case of fault or failure of the primary unit 120, the secondary unit will take over controlling and regulating the turbine 50. The case of failure of the secondary unit will be specified hereinbelow.

"In default" means "faulty".

Conversely to double-channel FADEC which makes redundant all functions, and therefore their associated input 60 and output 70 data, the control system 100 performs a redundancy only for the functions aforementioned, by means of the secondary unit 140, giving the name "partial redundancy".

This partial, or simplified redundancy ensures functions for starting the engine in degraded mode or maintaining the engine as a degraded operation, when the primary unit 120 is faulty.

In fact, it is possible to control an aircraft and its gas turbine 50 without having to use all the available information. The aircraft then will not function in optimal mode but there are several other modes of operation of the aircraft, such as degraded mode which needs only some inputs to generate corresponding outputs. These inputs and these outputs are associated with the strict subset of functions called "vital", or "essential", or even "critical". The references 60v and 70v for the inputs and outputs called "vital" and the references 60n and 70n for the inputs and outputs called "non-vital" are associated. Minimal surveillance functions can be considered as vital, to the extent where they guarantee the security of the system.

The control system 100 has the vital functions transit via the secondary channel in case of failure of the primary channel, that is, the secondary unit 140 must be capable of processing these functions when the primary unit 120 is not able to do it. For example, the secondary channel 140 again takes over the actuators identified as vital when a fault is observed on the primary channel 120.

This switching must limit the transitory state associated with toggling from one channel to the other.

To verify operation of the FADEC 100, each one of the units 120, 140 comprises a respective surveillance module 170, 180 (see FIG. 3), also called "monitoring".

Each surveillance module 170, 180 can monitor the state of its unit 120, 140 and establish operability status.

Also, a selection and switching module 160, is provided to allow toggling from the first channel to the second channel when the first channel is identified as being in default. The module 160 is in communication with the surveillance module 170 of the primary unit 120.

The module 160 comprises two sub-devices: a selection device 164, which receives information from the surveillance module 170 via a communication 162, and a selection and switching module device 166, controlled by the selection device 164.

Therefore, once the selection device 164 receives information relative to an anomaly in the region of the primary unit 120, detected by the surveillance module 170, it controls the selection device 164 which causes switching between the two channels. The primary unit 120 is selected to regulate the turbine 50 as long as the primary unit 120 is not in default. As soon as a fault is detected on the primary unit 120, the secondary unit 140 is switched to control and regulate the gas turbine 50.

As indicated previously, the secondary unit 140 forms a dissimilar redundancy channel, compared to the primary unit 120. This absence of similarity can manifest in different forms, and can be combined: different functional blocks, different architectures, different components, However, it is not simply about software reconfiguration of the secondary channel of a double-channel FADEC such as presented in the introduction: the secondary unit 140 is also materially different to the primary unit 120.

In an embodiment, the primary unit 120 is embodied as is known by means of a digital circuit, typically with a microcontroller 122 which executes software code and the secondary unit 140 is embodied by means of an analog circuit or a logic circuit programmable without software 142, that is, a component not executing lines of codes. The primary unit 120 is essentially as exists in the double-channel FADEC.

Dissimilarity can also manifest in the cycle time and the computing time. Due to the simplicity of the secondary unit 140 relative to the primary unit 120, the secondary unit 140 advantageously exhibits time characteristics shorter than those of the primary unit 120. This temporal or frequential desynchronization of both channels does not have the same points of susceptibility relative to the perturbers EMC (Electro Magnetic Compatibility): the two units will therefore be dissimilar relative to temporal or frequential perturbations EMC. In fact, with the circuits of the primary unit 120 and of the secondary unit 140 functioning at different frequencies, their behaviour relative to perturbers EMC will also be different. This temporal or frequential dissimilarity reinforces resistance to perturbers EMC at the overall FADEC level 100: if the primary unit is defaulted by a perturber EMC, the secondary unit 140 will take over and will not be affected by this same perturber.

The fact of using a dissimilar and simplified secondary unit 140 limits the risk of breakdowns linked to common causes between the primary channel and the secondary channel, and also breakdowns linked to the number of components.

In limiting the number of components and their complexity, the intrinsic reliability of the secondary unit 140 is improved. In particular, the secondary unit 140 comprises strictly fewer components than the primary unit 120 or components strictly more reliable due to their fewer complexities.

The two units 120, 140 are developed and manufactured according to standardised methods with the aim of preventing the occurrence and introduction of faults from conception.

Conversely to the double-channel FADEC, for which a common-mode fault, that is, a fault relative to design and manufacture, can affect the two units 11, 12 (see FIG. 1) and therefore the two channels, the dissimilarity in design, and manufacture, protects the control system 100 from this type of failure.

The two units 120 and 140 can independently process the vital functions, preventing propagation of an erroneous state of the primary channel to the secondary channel, or vice versa.

The electric power feed is an important failure factor in the FADEC, especially because of variations in voltage and current the latter may undergo.

It is on the preferable principle of duplicating the supplies 130, 150 of the primary 120 and secondary 140 units to prevent a single point failure associated with a power supply defect.

As shown in FIG. 3, two administration interfaces of supplies 130, 150 receive power at input from a source 55 and convert this power into voltage and intensity adapted to its respective unit 120, 140. The interfaces 130, 150 are advantageously integrated into the units 120, 140.

The source 55 is typically an on-board network, in turn supplied either by a main generator or by an auxiliary generator powered by the gas turbine 50, or by a battery.

In the primary unit 120, input 126 and output 128 conditioning modules, respectively upstream and downstream of the micro-controller 122 along the primary channel are provided. The function of the input 126 conditioning module is to adapt the input data 60 and the function of the output 128 conditioning module is to adapt the output data 70 so they can then control actuators, for example. FIG. 3 illustrates this embodiment.

Typically, the conditioning module 126 of the primary unit 120 converts the signals 60$n$ and 60$v$ into digital data so they can be processed by the controller 122.

The conditioning module 128 of the primary unit 120 converts the signals coming from the module 122 into power signals 70$v$ and 70$n$ capable of controlling the actuators.

The secondary unit 140 comprises a secondary controller 142, as well as input 146 and output 148 conditioning modules respectively upstream and downstream of the controller 142 along the secondary channel.

Typically, the conditioning module 146 of the secondary unit 140 converts the signals 60$v$ into digital data in the event where the module 142 is constituted by a programmable logic circuit or adapts and shapes the signals 60$v$ in the event where the module 142 is constituted by analog functions.

The conditioning module 148 of the secondary unit 140 converts the signals coming from the module 142 into power signals 70$v$ capable of controlling the actuators.

It is evident that the components between the two units 122 and 142 are different by nature.

In the absence of failure within the control system 100, only the primary unit 120 controls and adjusts the machine. Yet, it is necessary to know all the same if the secondary unit 140 is operational so that switching happens on a functional unit at the necessary moment. Consequently, it is necessary for the secondary unit 140 to be in an operating state and perform calculations associated with regulation or control of the machine as if it was the one which was active in controlling the machine.

Also, the secondary unit 140 verifies its correct operation via the surveillance module 180. The primary unit 120 has access to the state of the secondary unit 140. This information being known, the secondary faulty unit 140 can be replaced during a maintenance operation before launching any mission needing operational reliability of $10^{-6}$ (mission ETOPS for an APU . . . ).

The surveillance module 180 of the secondary channel analyses the state of operability of the secondary channel and of the secondary unit 140.

Communication 172 of the secondary channel to the primary channel is provided: this is typically an exchange of information between the surveillance module 180 and the surveillance module 170.

So, when the primary channel is requested, the surveillance unit 170 all the same retrieves information relative to the state of the secondary unit 140 (i.e. the operability status) via the communication 172 and the surveillance unit 180. These data are then sent on via the primary unit 140, and typically via the surveillance unit 170, to an avionics or maintenance bus 200, conventionally known per se. The information can then be retrieved from this bus to inform operators of the need for change of the secondary unit 140 if the latter has been identified as faulty. In this respect, it is recalled that the primary unit 120 must be identified as faulty before switching to the secondary unit 140 is done.

However, the state of the secondary channel is not considered in switching between the two channels: the primary channel is always active, except when a failure is detected, in which case the secondary channel takes over. In case of defect on the secondary channel, information will be sent to the bus 200 via the primary channel but this will have no impact on switching incidents.

The surveillance modules 170, 180 conduct auto-tests, that is, tests on their own respective channel to ascertain their operability status: routine, watchdog, auto-testable circuit, etc. If an anomaly is detected, the information is sent either to the selection and switching module 160 in the case of the primary channel, or to the surveillance module 170 of the primary unit 120 in the case of the secondary channel.

The switching module 166 of the selection and switching module 160 typically controls two power switches 167 and 168 (see FIG. 3). The power switch 167 connects the primary channel to an output of the system 100 and the power switch 168 connects the secondary channel to the same output of the system 100. These two power switches 167, 168 are never in the same state at the same time.

The function of the selection device 164 especially is to determine the most pertinent instant from when the secondary unit 140 takes over the primary unit 120. It is also about avoiding any major transition effect on the performances of the gas turbine.

Alternatively, it is possible that the primary unit 120 comprises two inputs and two outputs, respectively for the vital 60v/non-vital 60n inputs and the vital 70c/non-vital 70n outputs (see FIG. 3). In this way, only the vital output of the primary unit 120 can be deactivated by means of the power switch 167, the non-vital output never being disconnected. Since a failure concerning non-vital outputs 70n is not critical, such architecture is quite possible.

Communications between the two units are preferably limited to a strict minimum to have two units 120, 140 as independent as possible and accordingly contain breakdowns.

Control methods can be associated with the asymmetric control system 100.

Definition of Vital and Non-Vital, or Primary and Secondary, or Essential and Non-Essential Parameters For the secondary unit 140 to be more reliable, its architecture is simplified and no longer receives all the input data 60 and no longer controls all the outputs 70.

The secondary unit 140 is configured to receive only data called "vital". Acquisition of the speed of the aircraft and the control of fuel are parameters considered as vital. Their relative data are therefore made redundant via the second channel.

In general, those parameters necessary for turning the turbine 50 in an at least degraded manner in the event of breakdown of the main unit will be qualified as vital.

The attribution to a parameter of vital character or not can be made in several ways.

There are known and standardized methods of analysis which determine the functions which are vital to operation of the gas turbine. Examples are the FMEA (for "Failure Mode and Effects Analysis", also called "Failure Modes"), the FMECA (for "Failure Mode and Effects, and Criticity Analysis) translated as AMDEC (for "Analysis of Failure Modes, their Effects and their Criticity), or also FMA (for "Failure Mode Avoidance").

The parameters for which there is a fallback value sufficient for operation of the gas turbine 50 over a complete range but in degraded mode will be considered as non-vital. These fallback values can be either the last value measured or a value fixed by default. The severest value is selected for example so that irrespective of the real value, the control system 100 in fact considers a less favorable value.

The parameters which do not cause stopping of the machine or non-starting in case of loss of said parameter are not redundant either.

The list of critical functions to be made redundant, that is, which must be able to be processed by the secondary unit 140 in case of failure of the primary unit 120, corresponds to all the functions which, in the event of breakdown, cause stopping or non-starting of the gas turbine 50.

The other functions which have minor effects relative to operation of the gas turbine 50, that is, which do not cause stopping or non-starting, are not redundant.

Below is a non-exhaustive list of essential parameters:
The inputs:
  Speed sensor,
  Logic information: start/stop of the turbine,
The outputs:
  Start engine,
  Igniters,
  Fuel meter,
  Oil purge valve,
  Pilot lights "Gas turbine On" and "Gas turbine Off".
Below is a non-exhaustive list of non-essential parameters:
The inputs:
  Air turbine input temperature sensor,
  Gas output temperature sensor,
  Oil filings sensor,
  Oil filter clogging sensor, Oil level sensor,
Oil pressure sensor,
Oil temperature sensor,
Fuel filter clogging sensor,
Fuel temperature sensor,
Ambient pressure sensor,
Ambient temperature sensor,
Logic information:
  Ground-Flight
    Equipment 'WARNING' information (ignition unit, fuel pump, alternator controller, etc.),
The outputs:
  Pilot lights "Gas turbine READY" and "Gas turbine START",
  Instrumentation links.

For example, if the datum of the air input temperature is unknown, the control system 100 will consider a fallback temperature (example temperature of 60° C., which is the most restrictive temperature for the machine).

The invention claimed is:

1. An asymmetric electronic control system of a gas turbine configured to control a set of functions associated with logic input data or coming from sensors and associated with output data especially for actuator(s), said system comprising:
   a primary electronic control unit, configured to process the entire set of functions,
   wherein the electronic control system also comprises:
   a secondary electronic control unit, partially redundant with the primary unit, configured to process only a strict subset of functions sufficient to maintain in operation or start the gas turbine according to a degraded mode acceptable when the primary unit is in default,
   a selection and switching module for the selection and switching of one or the other of the primary and secondary units for regulating the gas turbine as a function of an operating state of said primary unit.

2. The control system according to claim 1, wherein the strict subset of sufficient functions corresponds to the vital functions of the gas turbine.

3. The control system according to claim 1, wherein the primary unit and the secondary unit are dissimilar in terms of architecture.

4. The control system electronic according to claim 1, wherein the primary unit is implemented by a digital circuit and the secondary unit is implemented by an analog circuit or a programmable logic circuit.

5. The electronic control system according to claim 1, wherein the primary unit comprises a micro-controller controlled by a software solution and the secondary unit comprises a logic circuit programmable without software.

6. The control system according to claim 1, wherein the primary unit is configured to transmit to an avionics or maintenance bus the operability status of the secondary unit said operability status being realized by the secondary unit itself to enable replacement of the single secondary unit or of the control system.

7. The control system according to claim 1, wherein the secondary unit does not process the following inputs:
   air turbine input temperature sensor,
   gas output temperature sensor,
   oil filings sensor,
   oil filter clogging sensor,
   oil level sensor,
   oil pressure sensor,
   oil temperature sensor,
   fuel filter clogging sensor,
   fuel temperature sensor,
   ambient pressure sensor,
   ambient temperature sensor,
   logic information:
      ground-flight
         equipment 'WARNING' information (ignition unit, fuel pump, alternator controller, etc.).

8. The control system according to claim 1, wherein the secondary unit processes only the following inputs:
   speed sensor,
   logic information: start/stop of the turbine,
   controls the following outputs (70v):
   start engine,
   igniters,
   purge valve,
   pilot lights "Gas turbine On" and "Gas turbine Off", and regulates the fuel meter.

9. The control system according to claim 1, wherein the secondary unit comprises fewer components than the primary unit to achieve improved reliability.

10. An assembly comprising a gas turbine and a control system according to claim 1.

* * * * *